Patented Feb. 19, 1946

2,394,993

UNITED STATES PATENT OFFICE 2,394,993

POROUS COMPOSITIONS

Henry A. Gardner, Chevy Chase, Md.

No Drawing. Application September 18, 1942,
Serial No. 458,842

8 Claims. (Cl. 106—122)

This invention relates to a new composition of matter and a method of making the same and to articles made from the new composition of matter.

It has been found that light-weight substances having valuable new properties and a wide variety of useful applications may be obtained by reacting a finely divided metal in substantial proportions with a binder composition capable of reacting with the metal with evolution of a gas. The finely divided metal forms a substantial proportion of the resulting substance, preferably not substantially less than ten per cent but not substantially more than 50 per cent by weight thereof. Any metal or metal alloy capable of reacting in comminuted form with a suitable binder substance, such as an acidic or acid-containing composition, with evolution of a gas, may be used, such as, for example, aluminum, magnesium, zinc, and iron. In general, however, metals of low specific gravity such as aluminum and magnesium result in compositions having particularly desirable properties.

The reactive binder substance is preferably a material consisting of or containing organic acids, such as shellac, rosin and other acidic or acid-containing natural resins, or synthetic plastic or resinous substances containing, for example, phthalic, malic, maleic and other acids, or their acid reaction products. The acidic binder substance may be utilized in solution or in liquid or semi-solid condition.

The new compositions of the invention are porous, coherent substances comprising a substantial portion of finely divided metal particles bonded together by a binder substance reactive with the metal to produce a gas and the reaction product of the metal and the binder substance. In general, it is believed that the reaction of the binder substance with the metal particles not only produces a gaseous reaction product which serves to form a multitude of pores in the final product, but also produces a reaction product with a portion of the metal which substantially increases the binding effect and contributes to the physical characteristics of the final product.

In general, the products of the invention are lightweight, porous substances having a metallic appearance. Particularly when made of metals having a low specific gravity, they have a low apparent density and readily float on water. The new products are typically non-conductors of electricity and have a high insulation power to heat flow. The heat insulating properties of the substances due to their porous structure may be very considerably enhanced when the metal particles have a high reflecting power for radiant energy in the infra-red, such as aluminum powder.

The method of producing the new products will vary with the particular metal and binder substance used, but, in general, the new materials may be produced by mixing the finely divided metal and the reactive binder substance, and, where necessary, heating or cooling the mixture to maintain a temperature at which the desired amount of gas is evolved under controllable conditions. The passing of a gas such as carbon dioxide, hydrogen or compressed air, into the reacting mixture is at times advantageous in producing a product of enhanced porosity.

The following examples are illustrative of the principles of the invention:

*Example 1*

20 parts by weight of dry shellac are dissolved in 80 parts by weight of alcohol. There is thoroughly mixed into the solution 20 parts by weight of finely divided aluminum powder. The mass is poured into a container, preferably filling it and not allowing any excess air space. The container is then capped. In a few hours at a room temperature of 80° F., reaction takes place. Hydrogen is developed in the mass which then becomes puffed up. Solidification gradually proceeds until the mass will no longer pour.

If during the reaction the mass is placed in an oven at 140° F., the reaction takes place with greater violence, and in an hour or less it may be completed.

The container is then unsealed and, if glass, it is broken to remove the solid inside.

If the above ingredients are mixed in the above proportions and vacuum is used during the process, an even more speedy reaction takes place.

If the alcohol used in the above mixture contains a small quantity, say one per cent or less, of alkali such as sodium hydroxide in solution, the reaction becomes very violent. Neither heat nor vacuum is required under these conditions.

In any event, the product of the above reaction is in a solid form and has a honeycomb structure. It appears to have most of the characteristics of metal, such as hardness, brilliancy of color, rigidity. It may be worked with tools. It floats upon water. It is insoluble in the organic solvents, such as alcohol, which might have been used in the reaction mass. It is a non-conductor of electricity. It has an extremely low bulk weight. It has unique sound absorbing and insulating characteristics.

Example 2

100 parts by weight of phthalic anhydride are heated with one-half its molecular weight of glycerin to a temperature of about 200° C. when reaction occurs and partial esterification takes place. This clear water white substance is then allowed to cool to just above the point of solidification, and there is then stirred in the mass about 20 parts by weight of aluminum powder. Reaction occurs and a puffy mass results. If during this reaction a jet of warm air is passed through the mass, much more puffing occurs, and a honeycomb structure results.

Example 3

In reactions similar to those given in Examples 1 and 2, magnesium powder and zinc powder have been employed. The reactions with magnesium powder are extremely energetic. Those with zinc powder are less so. Nevertheless, somewhat similar "metaloidal" substances were formed.

The reaction may be carried out in molds shaped to produce useful articles of manufacture or to produce pieces such as rods or slabs which may be readily worked up into articles of manufacture, or the reaction products may be broken up and formed into the desired articles by molding under heat and pressure, particularly when the binder composition produced in the reaction has thermoplastic or residual thermosetting properties.

The following description will indicate the wide range of usefulness of the new materials:

A metal chamber, in miniature resembling the door of a refrigerator, was filled with a liquid mixture such as is described in Example 1. After proper reaction there was formed within this metal chamber a solidified, honeycomb product having all the characteristics referred to above. It formed a vermin-proof, highly insulating door or side wall which could be used on refrigerators. Its insulating value appeared to be extremely high. It could therefore be used not only in refrigerators but for the side walls and roofs of railroad cars for transportation of fruit, meats, and the like.

A miniature form was made, resembling the shape of an airplane wing. Into this form were placed a few rigid wire rods to serve as reinforcements. There was then poured into this area a mixture such as is described in Example 1. After proper reaction, the form was removed. There was produced, by this cold molding process, a solid airplane wing of excellent rigidity but of extremely light weight, with good strength and other desirable physical properties. This wing will float on water. It is believed that this process offers wide possibilities in the speedy production of airplane wings, in contrast with the slow, laborious methods now employed in the building of such wings with sheets of metal or with plywood. There could be left in such wings spaces which could be utilized for holding gas tanks.

Because of the very porous nature of the material produced in Example 1, the space between the inner and outer shells of a small model of a gas tank was filled with this material and the reaction carried out at a temperature of 140° F. The purpose of this was to produce a bullet-proof gasoline tank from which very little if any gasoline would leak if such tank was riddled with bullets.

When the reaction product of Example 1 was formed into a doughnut-shaped ring and covered with suitable fabric, it formed a very light, tough, waterproof product which could be used as a life preserver. It floats upon water and does not become water-logged.

At the present time huge tonnages of metallic lead are used for coating electric conduits and cables. The unique properties of metallic lead and its durability make it highly desirable for this purpose. I have found, however, that the reaction product of Example 1 may be used in place of lead for the above purpose. It forms an extremely resistant, waterproof covering for the cable wires. Fortunately, it has the unique property of being a non-conductor of electricity, whereas aluminum and most other metals are good conductors.

When a pipe made of very thin side walls of steel metal or cellulose base products is filled with the reaction product of Example 1, a rigid member is formed, which is extremely light in weight but which has great strength. This would adapt this material for making struts and other rigid members of aircraft.

When cardboard is formed into a cylindrical container in a double wall thickness, the space between the walls may be filled with the reaction product of Example 1, to add greatly to the strength of the container.

When the reaction products of Example 1 are cast by cold molding into the form of slabs, preferably about one inch thick and from 12 inches square up, a most unique product is produced. This product may be used for many purposes. It has very remarkable sound absorbing properties because of the unique structure of the material. It may therefore be used very widely in the production of sound absorbing ceilings for offices, factories, and other places.

It can also be used as a roofing material because of its very great resistance to the conduction of heat or cold. Dwellings roofed with this product would be warmer in winter and cooler in summer. It could also be used in the production of flooring blocks to produce floors which are sound absorbing, tough, resistant to traffic, and of a highly durable nature. It could also be pressed in the form of siding or shingles to produce extremely durable structural surfaces which would be waterproof, resistant to the transmission of heat or cold, and sound absorbing. It could also be pressed into the form of furniture to produce extremely light weight furniture of good strength.

The reaction product of Example 1 may be cold molded in the form of pipe which would be extremely light in weight and resistant to soil conditions. Through pipe lines made of this material could be pumped oil, water, or other materials.

I claim:

1. As an article of manufacture, a porous rigid dielectric metalloidal body characterized by a honeycomb structure and an apparent density less than that of water, said body containing a minor proportion not less than about 10% by weight of finely divided particles of a metal of the group consisting of aluminum and magnesium bonded together with an acidic resinous binder, including the solid reaction product of the metal with the acidic component of the resinous binder.

2. As an article of manufacture, a porous rigid dielectric metalloidal body characterized by a honeycomb structure and an apparent density less than that of water, said body containing a minor proportion not less than about 10% by weight of finely divided particles of a metal of the group consisting of aluminum and magnesium bonded together with an acidic phthalic anhydride-glycerin resin binder including the reaction product of the metal with said acidic resin.

3. As an article of manufacture, a porous rigid dielectric metalloidal body characterized by a honeycomb structure and an apparent density less than that of water, said body containing a minor proportion not less than about 10% by weight of finely divided particles of a metal of the group consisting of aluminum and magnesium bonded together with a shellac binder including the reaction product of the metal with an acidic component of shellac.

4. As an article of manufacture, a porous rigid dielectric metalloidal body characterized by a honeycomb structure and an apparent density less than that of water, said body containing a minor proportion not less than about 10% by weight of finely divided aluminum particles bonded together with an acidic phthalic anhydride-glycerin resin binder including the reaction product of the aluminum with said acidic resin.

5. As an article of manufacture, a porous rigid dielectric metalloidal body characterized by a honeycomb structure and an apparent density less than that of water, said body containing a minor proportion not less than about 10% by weight of finely divided aluminum particles bonded together with a shellac binder including the reaction product of the aluminum with an acidic component of shellac.

6. Process of making a rigid dielectric metalloidal body having a honeycomb structure and an apparent density less than that of water, which comprises admixing finely divided metal of the group consisting of aluminum and magnesium with an at least equal amount by weight of an acidic resin capable of reacting with the finely divided metal with evolution of a gas, confining the mixture within an enclosed space, and subjecting the mixture, under conditions to accommodate puffing of the latter, to a temperature at which said acidic resin reacts with a portion of said finely divided metal until the mixture is materially honeycombed and solidified and volatile ingredients substantially separated from the solid product.

7. Process of making a rigid dielectric metalloidal body having a honeycomb structure and an apparent density less than that of water, which comprises admixing 20 parts by weight of finely divided aluminum with a partial esterification product of 100 parts of phthalic anhydride with one-half its molecular weight of glycerin, confining the mixture within an enclosed space, and subjecting the mixture, under conditions to accommodate puffing of the latter, to a temperature at which said resin reacts with said finely divided aluminum until the mixture is materially honeycombed and solidified and volatile ingredients are substantially separated from the solid product.

8. Process of making a rigid dielectric metalloidal body having a honeycomb structure and an apparent density less than that of water, which comprises admixing 20 parts by weight of finely divided aluminum with about 20 parts by weight of shellac in fluid form, confining the mixture within an enclosed space, and subjecting the mixture, under conditions to accommodate puffing of the latter, to a temperature at which said shellac reacts with said finely divided aluminum until the mixture is materially honeycombed and solidified and volatile ingredients are substantially separated from the solid product.

HENRY A. GARDNER.